US005584349A

United States Patent [19]

Wilson

[11] Patent Number: 5,584,349
[45] Date of Patent: Dec. 17, 1996

[54] MECHANIZED TOOL

[76] Inventor: Randall W. Wilson, 6975 Desert Forest Rd. #2031, Hesperia, Calif. 92345

[21] Appl. No.: 404,911

[22] Filed: Mar. 16, 1995

[51] Int. Cl.$^6$ .............................. A63H 5/00; A01B 35/22
[52] U.S. Cl. .................. 172/41; 172/101; 74/50
[58] Field of Search .................................. 172/107, 102, 172/41; 74/50

[56] References Cited

U.S. PATENT DOCUMENTS

| | | |
|---|---|---|
| 3,406,761 | 10/1968 | Ryan . |
| 4,122,902 | 10/1978 | Alexander ................................ 172/41 |
| 4,305,470 | 12/1981 | Anderson ................................ 172/41 |
| 4,353,422 | 10/1982 | Bennett, Jr. ............................ 172/41 |
| 4,385,443 | 5/1983 | O'Banion ................................ 74/50 |
| 4,541,492 | 9/1985 | Motruk .................................. 172/41 |
| 4,553,606 | 11/1985 | Arnold . |
| 4,939,944 | 7/1990 | Hou ........................................ 74/50 |
| 4,987,787 | 1/1991 | Hou ........................................ 74/50 |
| 5,079,844 | 1/1992 | Palm ....................................... 74/50 |
| 5,212,887 | 5/1993 | Farmerie ................................ 74/50 |

FOREIGN PATENT DOCUMENTS 558549 3/1957 Italy ........................................ 74/50

Primary Examiner—Terry Lee Melius
Assistant Examiner—Christopher J. Novosad
Attorney, Agent, or Firm—Terrance L. Siemens

[57] ABSTRACT

A mechanized tool that produces rectilinear reciprocal motion for a tool carrying shaft is disclosed. In the preferred embodiment, a rotating power takeoff shaft is attached to a circular disk, bar, or flywheel that has thereon a cam follower or protrusion. This cam follower is carried within a slot that is slidably mounted on a pair of guide rails or within a guide slot or guide rail. Also attached to the movable slot is a tool carrying shaft. Thus as the disk spins, the tool carrying shaft is moved in a reciprocal manner, with power being applied in the stroke in both directions. A pivotable cutting hoe is attached to the tool carrying shaft in the preferred embodiment.

13 Claims, 1 Drawing Sheet

MECHANIZED TOOL

BACKGROUND OF THE INVENTION

1. Field of the Invention

The present invention relates to tools utilizing a mechanical power takeoff. More specifically, the present invention relates to a mechanized tool that generates a reciprocating motion with power strokes in both directions: such a tool being especially useful for applications such as hoes, thatching forks, and the like. More generally, the present invention relates to any application where constant, powerful, reciprocating motion is desired as an end product: agitation of an inclined bed of slurry in a mining operation, for example. The field of agriculture is seen as the most likely benefactor from the novel aspects of this invention. However, the fields of mechanical construction, manufacturing, and surgery could also benefit.

Thus it can be seen that the potential fields of use for this invention are myriad, and the particular preferred embodiment described herein is in no way meant to be limiting the particular field chosen for exposition of the details of the invention.

2. Description of the Prior Art

In preparing the ground for cultivation, it is necessary to loosen the soil. Additionally, while the plants are growing, weeding requires the disturbing of the soil between the cultivated rows. Since time immemorial, tools such as hoes have been used for this purpose. The motion used to properly utilize these types of tools is a reciprocating one: back and forth, or rectilinear. As the user bends over and moves the tool head back and forth, both back pain and upper body fatigue can result. The present invention seeks to address this problem by providing a mechanism that takes a rotating power takeoff and converts the same into rectilinear reciprocating motion of a single shaft (or multiple shafts—the present invention could be easily adapted to have more than one shaft, as will be seen below) that is attached to the tool head. The construction of the present invention allows for power strokes in both directions. This motion would be useful with tool heads such as blade hoes, thatch rakes, and the like. During a search at the U.S. Patent and Trademark Office, the following patents were uncovered that relate to the instant invention:

First is U.S. Pat. No. 3,406,761 issued on Oct. 22, 1968 to Thomas H. Ryan discloses a power tool wherein a pivotable power cylinder carries a rod therein that includes a universal tool attachment. The cylinder is attached to a frame with an upstanding carriage that includes the motor and the reservoir for activation of the cylinder. Contrast this to the present invention where the constantly reciprocating motion of the tool head is induced in such a way that the power is delivered in both directions of the stroke.

In U.S. Pat. No. 4,353,422 issued on Oct. 12, 1982 to James H. Bennett, Jr. there is disclosed a hand held machine with an oscillating tool. A gearmotor and a drive shaft connected to various linkages provide an oscillating, up and down, back and forth motion, similar to that of the standard hoeing, or raking motion. This is dissimilar from the present invention in that the reciprocating motion produced by the instant invention substantially lies in a single plane, thus keeping the tool head attached thereto in constant contact with the work area.

U.S. Pat. No. 4,122,902 issued on Oct. 31, 1978 to Warren A. Alexander discloses a motorized gardening tool wherein a first reciprocating motion is converted to a second motion at a substantial angle to the first. This second motion drives a tool head that is carried on a series of leaf spring connected linkage members. Contrast this to the present invention wherein the rotating power takeoff is connected to a flywheel that includes a cam follower to induce the reciprocating motion of the tool head carrier.

In U.S. Pat. No. 4,553,606 issued on Nov. 19, 1985 to William T. Arnold discloses a sod cutting machine that has a pair of mirror image under and side cutting knives. Eccentric stub shafts 180° out of phase attached to the linkage arms drive the blades in oppositely reciprocating motions. This is clearly unlike the present invention, in that no single reciprocating tool carrying portion is discussed.

U.S. Pat. No. 4,305,470 issued on Dec. 15, 1981 to Elbert J. Anderson there is disclosed a power hoe with a reciprocating cutting head. A rotating drive shaft terminates in a drive plate carrying a drive pin. This pin is inserted into a piston carried by a sleeve. This is attached to the cutting head of a tool to provide reciprocating motion thereto. This is dissimilar from the present invention in that the cutting head is reciprocated through a swivelling linkage instead of a straight rectilinear motion in the tool carrying shaft provided in the instant invention.

Lastly, U.S. Pat. No. 4,541,492 issued on Sep. 17, 1985 to John Motruck discloses an earth working tool head. A rotating drive shaft is connected by a pair of cooperating bevel gears to an axle that carries, at either of its ends, a pair of fixed disk elements. These have pins located 180° out of phase with one another and, thus, transmit pendulum-like movement to a pair of linked earth cutting blades. This is seen to be unlike the present invention, as no rectilinear reciprocating motion in a tool carrying portion is disclosed.

None of the above inventions and patents, taken either singly or in combination, is seen to describe the instant invention as claimed.

SUMMARY OF THE INVENTION

The present invention is a mechanized tool that produces rectilinear reciprocal motion for a tool carrying shaft. In the preferred embodiment, a rotating power takeoff shaft is attached to a circular disk or flywheel that has thereon a cam follower of protrusion. This cam follower is carried within a slot that is slidably mounted on a pair of guide rails. Also attached to the movable slot is a tool carrying shaft. Thus as the disk spins, the slot and tool carrying shaft are moved, in a reciprocal manner, with power being applied to the stroke in both directions. A pivotable cutting hoe is attached to the tool carrying shaft in the preferred embodiment.

Accordingly, it is a major object of the invention to provide a mechanized tool that overcomes the disadvantages of the prior art.

It is a major object of the invention to provide a mechanized tool wherein a tool carrying shaft is provided with rectilinear, reciprocal motion, and where power is supplied to both stroke directions.

It is another object of the invention to provide a mechanized tool wherein the motive power for the tool is a rotating power takeoff shaft.

It is a further object of the invention to provide a mechanized tool wherein the translation of the rotational motion to reciprocal shaft motion is accomplished by attaching a circular disk or flywheel to the end of the takeoff shaft, and where a cam follower located thereon travels in a slidable receiving shaft which in turn is attached to the tool carrying shaft.

Still another object of the invention is to provide a mechanized tool wherein the tool at the end of the carrying shaft could be a hoe, a thatching rake, or other cultivation tool.

It is a major goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 3:
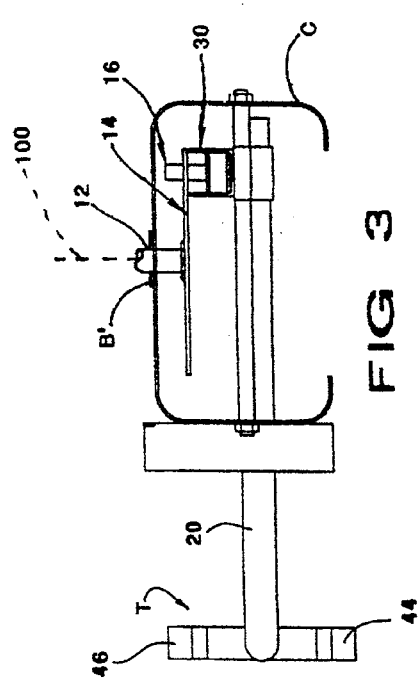
FIG. 3 is a partial top plan view showing the cam follower within the slidable channel.

The invention is indicated generally as a tool mechanism 10. The power takeoff shaft 12 is connected to any engine (not shown) that customarily delivers power in that fashion. It is contemplated that gasoline, electrical, diesel, or battery powered engines could be used for this purpose. The takeoff shaft has a longitudinal axis 100, seen in FIGS. 1 and 3. The means for translating the rotational energy of the takeoff shaft 12 to the reciprocal motion of the generally horizontally disposed tool carrying shaft 20 (best seen in FIGS. 1 and 2) will now be discussed. At one end of this takeoff shaft 12 is a disk 14. This disk could either be in a fixed relationship with the shaft 12 or could be interconnected thereto with a clutch (not shown). It is contemplated that the clutch could be of either a mechanical or friction type. The takeoff shaft 12 rotates the disk 14 in one or another of the directions indicated by arrow A1 in FIG. 1. The disk 14 has attached thereto a cam follower or protrusion 16 (shown in FIG. 3). As the shaft 12 and attached disk 14 rotate, cam follower 16 describes a circle about the center of disk 14. The cam follower 16 is maintained within a channel 30. The channel 30 is fixedly attached to the tool carrying shaft 20 as is indicated at 22 in FIG. 2. The channel 30 is additionally slidably attached to a pair of parallel, substantially horizontally disposed guide rails 32, 34 by means of sleeves 36, 38 fixed to the channel 30. The guide rails 32, 34 and the corresponding sleeves 36, 38 are shown here as being cylindrical rods surrounded by round sleeves, however it should be noted that a wide variety of shapes and sizes could be used. Rails with mating attachments are well known art devices and a skilled practitioner could easily envision a number of workable configurations. Thus, as seen in this embodiment, as the disk 14 rotates with its corresponding cam follower 16 or protrusion, channel 30 moves back and forth in the rectilinear manner indicated by arrow A2 in FIG. 2. The channel 30 transfers this motion to the attached tool carrying shaft 20, through virtue of the attachment at 22. Power is delivered by this arrangement in both the forward and backward stroke of the tool carrying shaft 20. This makes mechanized tool 10 extremely useful in applications where a large amount of resistance can be expected in both work directions: cultivation tools such as a pivotable hoe or a thatching rake, for example. These tools carried on the carrying shaft 20 will be discussed further hereinafter. Referring to FIG. 2, the guide rails 32 and 34 are seen to be attached to the protective housing or casing C by threaded engagements: i.e. a nut 37 tightened over a threaded end 39 protruding from the outside of the casing front wall C'. This is only used by way of example and other fastening means for the guide rails 32, 34 could be used. Welding to the interior of the casing C, for instance, could be substituted. The protective casing C would, preferably, completely surround the guide rails 32, 34, the disk 14, the channel 30, the guide sleeves 36, 38, and the portion of the tool carrying shaft 20 extending to the channel/shaft engagement 22. There preferably would be bushings B at the point where carrying shaft 20 extends outward, passing through the casing C, and likewise there would be bushings or gasket means B' (seen in FIG. 3) where the rotating power takeoff shaft enters casing C. The materials from which these elements could be made are varied, but different alloys of steel could be used as having the requisite strength to resist the torques that would be developed in the apparatus, both from the rotating disk 14 and its cam follower 16, but also from the resistance met by whatever tool is placed on the end of the carrying shaft 20. It should also be noted that the takeoff shaft could be either a fixed speed (as is common in a battery powered device), or it could have variable speeds set by the user to adjust to different environments or different tasks. Soils with a more clayish consistency are more difficult to work, for example, than a sandy or loamy soil.

Figure 1:
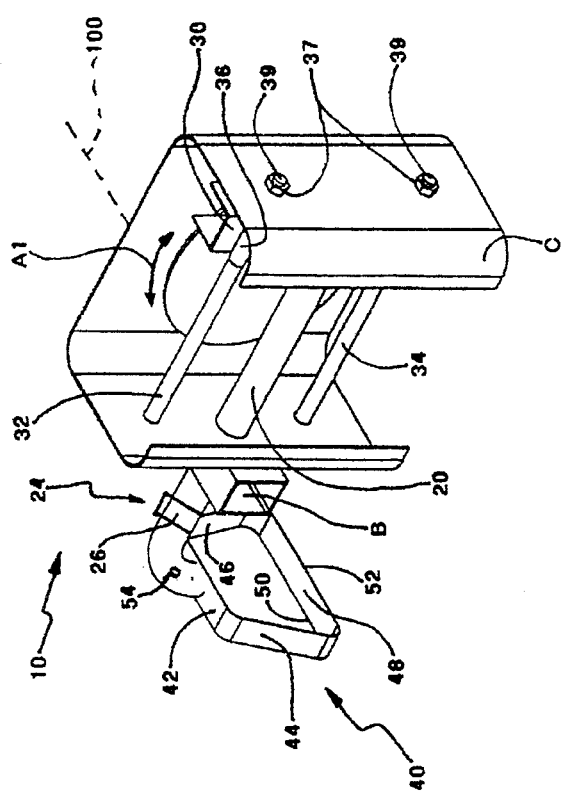
FIG. 1 is a perspective view of the preferred embodiment of the invention with part of the protective cover removed to reveal the interior construction.
Figure 2:
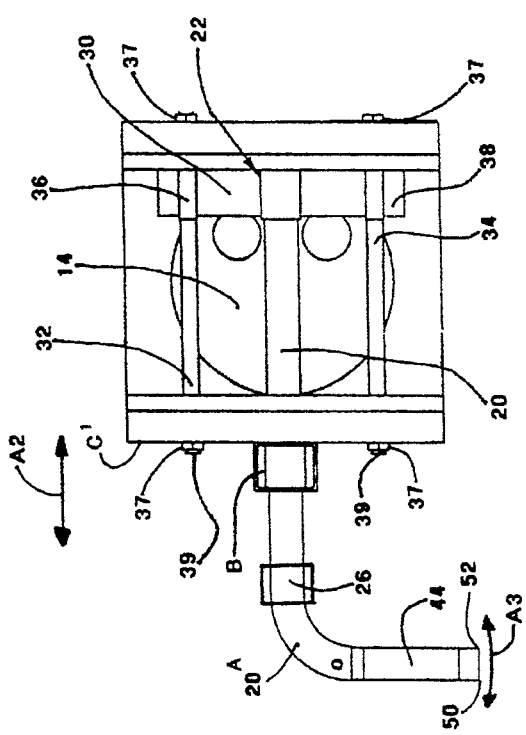
FIG. 2 is a side view of the invention.

The discussion now turns to the tool carrying shaft 20 which has (as can be seen in FIGS. 1 and 2) a tool attachment means 24 located at the end thereof. The tool attachment means 24, in this preferred embodiment, is made up of a mating collar 26. This mating collar 26 could be a threaded collar, or it could be a snap fit of some kind. Many types of "twist and lock" mating arrangements are known, and it should be emphasized that any number of them could be utilized without departing from the spirit of the invention. Pins could also be used to hold the tool in place. The tool or work implement (discussed herein below) could alternatively be permanently attached to the carrying shaft 12, as suggested in the view of FIG. 3.

In the embodiment described herein, the tool implement T attached to the tool attachment end 20a of the shaft 20 is a cutting head comprising a dual bladed hoe 40. This hoe 40 has a top 42, two descending side members 44, 46, and a bottom 48 with the top and two side members defining an inverted U-shape holder. The bottom 48 will be seen to comprise a horizontally disposed work piece member having forwardly and rearwardly directed sharpened edges 50 and 52, respectively and wherein the bottom 48 includes a blade member supported in a plane substantially parallel to but significantly offset from and below the horizontal tool carry shaft 20. Additionally, the hoe 40 has a pivoting means 54. This pivot means 54, allowing a limited freedom of motion as indicated by the directional arrow A3 in FIG. 2, is an art device that allows the two sharpened edges 50 and 52 to maintain a proper depth and angle while being reciprocated back and forth (indicated by directional arrow A2 in FIG. 2) in the manner previously described. Other tools could be fitted to the carrying shaft 20 that would benefit from the dual-direction reciprocating power stroke; thatching rakes, for example, or various edging implements.

It is also contemplated that the device could be independently wheeled, could be modified to be an attachment to an existing lawn edger, could be independently handheld, or could be an attachment to an existing rotating filament line vegetation cutter.

Additionally, it should be emphasized that the means of transferring the rotary motion of the disk to the reciprocating motion of the shaft are myriad. The channel 30 could be a bar with a slot therein to receive the protrusion 16, or the receiving portion for the protrusion 16 could be formed by a curved or rounded portion of the tool carrying shaft 20.

It is to be understood that the present invention is not limited to the sole embodiment described above, but encompasses any and all embodiments within the scope of the following claims.

I claim:

1. A power implement comprising:

a rotatable power takeoff shaft having a longitudinal axis, said takeoff shaft extending from a motor, and wherein the motor imparts a rotating motion to said takeoff shaft;

a substantially horizontally disposed tool carrying shaft;

translation means joining said takeoff shaft to said tool carrying shaft for translating said rotational motion of said power takeoff shaft to rectilinear reciprocating motion of said tool carrying shaft in a generally horizontal plane;

said tool carrying shaft having a downwardly directed attachment end, a tool affixed to said downwardly directed attachment end and having a bottom work piece disposed in a plane offset from and below said tool carrying shaft; whereby as said takeoff shaft rotates said tool bottom work piece is moved back and forth in a horizontal rectilinear reciprocating motion in a plane offset from and below said tool carrying shaft wherein said translation means comprises camming means including a protrusion extending generally parallel to said power takeoff shaft longitudinal axis.

2. The power implement as claimed in claim 1, wherein said translation means further comprises:

means holding said protrusion at a fixed distance from said longitudinal axis of said takeoff shaft proximate one end of said takeoff shaft, said protrusion being free to rotate about said longitudinal axis thus defining a camming means plane of rotation about said takeoff shaft end;

a channel fixedly attached to said tool carrying shaft at the distal end of said carrying shaft from said tool attachment end, said channel dimensioned and configured to receive said camming protrusion, said channel further including retaining means such that as said camming protrusion rotates about said longitudinal axis of said takeoff shaft, said channel remains substantially parallel to said plane of rotation, and said tool carrying shaft fixedly attached to said channel describes said horizontal rectilinear reciprocating motion.

3. The power implement as claimed in claim 2, wherein said channel retaining means comprises at least one guide rail parallel to said tool carrying shaft and said camming plane of rotation, and at least one slidable guide rail engagement means integral to said channel.

4. The power implement as claimed in claim 2, wherein said means to hold said camming protrusion at the fixed distance from said longitudinal axis of said takeoff shaft is a circular disk attached to said takeoff shaft at said end of said takeoff shaft, said disk thus having a takeoff shaft facing side and an opposite camming engagement side, said camming protrusion extending from said camming engagement side.

5. The power implement as claimed in claim 2, wherein said tool attached to said tool carrying shaft is removable.

6. The power implement as claimed in claim 5, wherein said attached tool includes a cutting head.

7. The power implement according to claim 6, wherein said attachment end of said tool includes an elbow, said cutting head having a carrying portion comprising an inverted U-shape holder depending from said elbow, and said bottom work piece depends from said inverted U-shape holder.

8. A power implement comprising:

a rotatable power takeoff shaft having a longitudinal axis, said takeoff shaft extending from a motor, and where the motor can impart a rotating motion to said takeoff shaft;

a horizontal tool carrying shaft having a distal offset tool attachment end, translation means for translating said rotational motion of said power takeoff shaft to horizontal rectilinear reciprocating motion in said tool carrying shaft where said translation means includes camming means including a protrusion extending generally parallel to said power takeoff shaft, and means holding said protrusion at a fixed distance from said longitudinal axis of said takeoff shaft proximate one end of said takeoff shaft, said protrusion being free to rotate about said longitudinal axis thus defining a camming means plane of rotation adjacent said takeoff shaft, following means including a channel fixedly attached to said tool carrying shaft at the distal end of said carrying shaft from said tool attachment end, said following means channel dimensioned and configured to receive said camming protrusion, said channel further including retaining means such that as said camming protrusion rotates about said longitudinal axis of said takeoff shaft, said following means channel remains substantially parallel to said plane of rotation, and said tool carrying shaft fixedly attached to said following channel describes horizontal rectilinear reciprocating motion; and a tool attached to said distal offset tool attachment end of said tool carrying shaft;

said tool having a bottom work piece disposed in a plane substantially offset from said tool carrying shaft; whereby, said tool is moved back and forth in a horizontal rectilinear reciprocating motion in a plane offset and parallel to said tool carrying shaft as said power takeoff shaft rotates.

9. The power implement as claimed in claim 8, wherein said following means channel retaining means comprises at least one guide rail parallel to said tool carrying shaft and said camming plane of rotation, and at least one slidable guide rail engagement means integral to said following means channel.

10. The power implement as claimed in claim 8, wherein said means holding said camming protrusion at the fixed distance from said longitudinal axis of said takeoff shaft is a circular disk attached to said takeoff shaft at said end of said takeoff shaft, said disk thus having a takeoff shaft facing side and an opposite camming engagement side, said camming protrusion extending from said camming engagement side.

11. The power implement as claimed in claim 8, wherein said tool attached to said tool carrying shaft is removable.

12. The power implement as claimed in claim 11, wherein said attached tool includes a horizontally disposed cutting head having forwardly and rearwardly directed sharpened edges.

13. The power implement according to claim 12, wherein said tool includes an elbow proximate said tool attachment end of said tool carrying shaft and where said tool further includes a cutting head carrying portion, said cutting head carrying portion including an inverted U-shape holder depending from said elbow, said carrying portion being pivotally attached to said elbow, and where said cutting head extends depends from said inverted U-shape.

* * * * *